US012735585B2

(12) United States Patent
Tsukiji et al.

(10) Patent No.: US 12,735,585 B2
(45) **Date of Patent: *Sep. 15, 2026**

(54) DISPERSANT-CONTAINING LIQUID AND DISPERSION

(71) Applicant: SEIKO EPSON CORPORATION, Tokyo (JP)

(72) Inventors: Nikako Tsukiji, Matsumoto (JP); Hiroshi Ito, Matsumoto (JP); Koichi Terao, Suwa (JP); Harunobu Komatsu, Matsumoto (JP); Hajime Kakishita, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 550 days.

This patent is subject to a terminal disclaimer.

(21) Appl. No.: 18/345,456

(22) Filed: Jun. 30, 2023

(65) Prior Publication Data

US 2024/0010857 A1 Jan. 11, 2024

(30) Foreign Application Priority Data

Jul. 5, 2022 (JP) ................................ 2022-108217

(51) Int. Cl.
*C09D 11/104* (2014.01)
*C09D 11/328* (2014.01)
*C09D 11/38* (2014.01)

(52) U.S. Cl.
CPC .......... *C09D 11/104* (2013.01); *C09D 11/328* (2013.01); *C09D 11/38* (2013.01)

(58) Field of Classification Search
CPC ..... C09D 11/104; C09D 11/328; C09D 11/38; C09D 11/326
See application file for complete search history.

(56) References Cited

U.S. PATENT DOCUMENTS 5,510,417 A 4/1996 Tachika et al.
5,913,972 A 6/1999 Kanou et al.
2004/0059020 A1 3/2004 Kamoto et al.
2016/0246200 A1 8/2016 Toyoda et al.
2019/0233665 A1 8/2019 Chopra et al.
2022/0055378 A1 2/2022 Komada
2022/0213341 A1 7/2022 Suzuki et al.
2024/0052068 A1 * 2/2024 Roller .................. C08G 18/706
2024/0279499 A1 8/2024 Iwasaki et al.

FOREIGN PATENT DOCUMENTS

CN 1165163 A 11/1997
JP H05-295239 A 11/1993
JP H10-114865 A 5/1998
JP 2005-036129 A 2/2005
JP 2011-225714 A 11/2011
JP 2016-176056 A 10/2016
JP 2022-034320 A 3/2022
JP 7651828 B2 3/2025
WO 2018-078078 A1 5/2018
WO WO-2022112042 A1 * 6/2022 ................ C08F 2/26

OTHER PUBLICATIONS

"Bisphenoxyethanolfluorene," ChemicalBook, www.chemicalbook.com/ChemicalProductProperty_EN_CB6747899.htm, 2025, 2 pages.
"Bisphenol A Bis(2-Hydroxyethyl)Ether," ChemBK, www.chembk.com/en/chem/Bisphenol%20A%20bis(2-hydroxyethyl)ether, 2025, 2 pages.

* cited by examiner

*Primary Examiner* — Joseph S Del Sole
*Assistant Examiner* — Olga Lucia Donahue
(74) *Attorney, Agent, or Firm* — Harness, Dickey & Pierce, P.L.C.

(57) ABSTRACT

A dispersion of the present disclosure includes a polyester functioning as a dispersant, water, and a dispersoid, and the polyester includes, as a monomer component, a first monomer having an aromatic ring on a side chain and a second monomer having at least one selected from the group consisting of a carboxy group which forms no ester bond and a sulfo group. A content of the first monomer with respect to all monomers forming the polyester is preferably 25 to 75 percent by mole.

11 Claims, No Drawings

DISPERSANT-CONTAINING LIQUID AND DISPERSION

The present application is based on, and claims priority from JP Application Serial Number 2022-108217, filed Jul. 5, 2022, the disclosure of which is hereby incorporated by reference herein in its entirety.

BACKGROUND

1. Technical Field

The present disclosure relates to a dispersant-containing liquid and a dispersion.

2. Related Art

A dispersion in which a dispersoid is dispersed in a dispersion medium including water has been used in various application fields.

As the dispersion as described above, for example, an ink in which a colorant is dispersed in a dispersion medium including water may be mentioned.

In the dispersion as described above, in order to improve a dispersibility of the dispersoid, a dispersant may be added in some cases.

For example, there has been known an ink jet-recording disperse dye ink containing water, a water-soluble organic solvent, a disperse dye, and a water-soluble polyester having an acid value of 100 to 250 (cf. JP-A-10-114865).

However, heretofore, a dispersion stability of a dispersoid, in particular, a sufficiently excellent dispersion stability thereof, in a dispersion is difficult to obtain when the dispersoid is formed from a highly lipophilic material, such as an organic dye including a disperse dye, an oil-soluble dye, and/or the like.

SUMMARY

The present disclosure was made to solve the problem described above and can be realized as the following application example.

A dispersant-containing liquid according to an application example of the present disclosure comprises a polyester functioning as a dispersant and water. In the dispersant-containing liquid described above, the polyester is a polyester which includes as a monomer component, a first monomer having an aromatic ring on a side chain and a second monomer having at least one selected from the group consisting of a carboxy group which forms no ester bond and a sulfo group.

A dispersion according to another application example of the present disclosure comprises a polyester functioning as a dispersant, water, and a dispersoid, and the polyester is a polyester which includes as a monomer component, a first monomer having an aromatic ring on a side chain and a second monomer having at least one selected from the group consisting of a carboxy group which forms no ester bond and a sulfo group.

DESCRIPTION OF EXEMPLARY EMBODIMENTS

Hereinafter, preferable embodiments of the present disclosure will be described in detail.

1. Dispersant-Containing Liquid

First, a dispersant-containing liquid of the present disclosure will be described.

The dispersant-containing liquid of the present disclosure contains a polyester functioning as a dispersant and water. The polyester is a polyester which includes, as a monomer component, a first monomer having an aromatic ring on a side chain and a second monomer having at least one selected from the group consisting of a carboxy group which forms no ester bond and a sulfo group.

According to the structure as described above, when a dispersion in which a dispersoid is dispersed using the dispersant-containing liquid is prepared, a dispersion stability of the dispersoid can be made excellent. In particular, even in a dispersion which contains a dispersoid formed from a highly lipophilic material, such as an organic dye including a disperse dye, an oil-soluble dye, and/or the like, the dispersion stability of the dispersoid can be made excellent. The reason the effect as described above can be obtained is believed as follows. That is, since the polyester including the first monomer and the second monomer described above is contained, while a sufficient adsorption to the highly hydrophobic dispersoid is secured, a solubility of the polyester to water can be made sufficiently high. As a result, it is believed that the dispersion stability of the dispersoid in the dispersion can be stably obtained for a long time.

On the other hand, when the conditions as described above are not satisfied, a satisfactory result cannot be obtained. For example, in the case in which the polyester contained in the dispersant-containing liquid as a dispersant includes, as a monomer component, no first monomer having an aromatic ring on a side chain, when a dispersion in which a dispersoid is dispersed using the dispersant-containing liquid is prepared, the dispersion stability of the dispersoid is degraded. In particular, in a dispersion containing a dispersoid formed from a highly lipophilic material, such as an organic dye including a disperse dye, an oil-soluble dye, and/or the like, an affinity between the polyester and the dispersoid is seriously decreased, and as a result, the dispersion stability of the dispersoid is degraded.

In addition, in the case in which instead of using the first monomer, a monomer having an aromatic ring on a main chain is used, when a dispersion in which a dispersoid is dispersed using the dispersant-containing liquid is prepared, the dispersion stability of the dispersoid also cannot be made sufficiently excellent. In particular, in a dispersion containing a dispersoid formed from a highly lipophilic material, such as an organic dye including a disperse dye, an oil-soluble dye, and/or the like, the affinity between the polyester and the dispersoid is decreased, and as a result, the dispersion stability of the dispersoid cannot be made sufficiently excellent.

In addition, when the polyester contained in the dispersant-containing liquid as a dispersant includes as a monomer component, no second monomer having at least one selected from the group consisting of a carboxy group which forms no ester bond and a sulfo group, an affinity between the polyester itself and water is seriously decreased, and in a composition containing water, the polyester can be neither dissolved nor stably dispersed. Hence, the polyester cannot function as a dispersant.

1-1. Water

The dispersant-containing liquid of the present disclosure contains water. The water described above primarily has a function to impart the fluidity to the dispersant-containing liquid and a dispersion prepared using the dispersant-containing liquid and functions as a dispersion medium or a solvating medium.

As the water, ion exchange water, pure water, or ultrapure water is preferably used.

Although a lower limit of a content of the water in the dispersant-containing liquid is not particularly limited, the lower limit described above is preferably 30.0 percent by mass, more preferably 35.0 percent by mass, and further preferably 40.0 percent by mass. In addition, although an upper limit of the content of the water in the dispersant-containing liquid is not particularly limited, the upper limit described above is preferably 93.0 percent by mass, more preferably 90.0 percent by mass, and further preferably 87.0 percent by mass.

Accordingly, the viscosity of the dispersant-containing liquid can be more reliably adjusted to a preferable value. In addition, the dispersion stability of a dispersoid in a dispersion prepared using the dispersant-containing liquid can be made more excellent.

1-2. Polyester Functioning as Dispersant

Although being a generic name of a high molecular weight material having an ester bond in its main chain, the polyester generally has a chemical structure formed such that a polyol component having a plurality of hydroxy groups in its molecule and a polycarboxylic acid component having a plurality of carboxy groups in its molecule are dehydration condensed.

In particular, the dispersant-containing liquid of the present disclosure contains as a dispersant, a polyester which includes as a monomer component, a first monomer having an aromatic ring on a side chain and a second monomer having at least one selected from the group consisting of a carboxy group which forms no ester bond and a sulfo group.

The first monomer may be a monomer having an aromatic ring on a side chain and may be either a polyol component or a polycarboxylic acid component.

As the aromatic ring present on a side chain of the first monomer, for example, a phenyl group, a biphenyl group, or a naphthyl group may be mentioned.

As the first monomer, for example, there may be mentioned phenylmalonic acid, phenylsuccinic acid, benzylmalonic acid, benzylsuccinic acid, phenylmethanediol, styrene glycol, 2-phenyl-1,3-propanediol, 3-phenyl-1,2-propanediol, or 4-phenyl-1,2-butanediol, and those mentioned above may be used alone, or at least two types thereof may be used in combination.

A lower limit of a content of the first monomer with respect to all monomers forming the polyester is preferably 25 percent by mole, more preferably 30 percent by mole, and further preferably 35 percent by mole. In addition, an upper limit of the content of the first monomer with respect to all the monomers forming the polyester is preferably 75 percent by mole, more preferably 70 percent by mole, and further preferably 65 percent by mole.

Accordingly, the adsorption of the polyester to a dispersoid, in particular, to a highly hydrophobic dispersoid, and the affinity/solubility of the polyester to the water can be simultaneously obtained at a higher level, and when a dispersion in which a dispersoid is dispersed using the dispersant-containing liquid is prepared, the dispersion stability of the dispersoid can be made more excellent. In addition, when the dispersion is an ink jet composition, while an ejection stability of the ink jet composition by an ink jet method can be made more excellent, a color development property of a recorded portion formed using the ink jet composition can be made more excellent. In addition, a water resistance of the recorded portion formed using the ink jet composition can also be made more excellent.

Although the second monomer may be a monomer having at least one selected from the group consisting of a carboxy group which forms no ester bond and a sulfo group, a monomer having a sulfo group is preferable.

In addition, although the second monomer may be either a polyol component or a polycarboxylic acid component, a polycarboxylic acid component is preferable.

As the second monomer having a carboxy group which forms no ester bond, for example, there may be mentioned an at least trivalent carboxylic acid compound, a lower alkyl diester or an anhydride thereof, a carboxy group-containing polyol, or a salt of at least one of those mentioned above, and those mentioned above may be used alone, or at least two types thereof may be used in combination. As the at least trivalent carboxylic acid compound mentioned above, for example, there may be mentioned tricarballylic acid, β-alanine diacetic acid, trimellitic acid, trimesic acid, pyromellitic acid, or mellophanic acid. As the carboxy group-containing polyol described above, for example, there may be mentioned N,N-bis(2-hydroxyethyl)-β-alanine or N,N-bis(2-hydroxyethyl)succinamic acid. In addition, as the second monomer, when a resin terminal modifier which will be described later is used, as the resin terminal modifier, for example, a divalent polycarboxylic acid monomer which will be described later may be used.

As the second monomer having a sulfo group, for example, there may be mentioned a sulfonated polycarboxylic acid monomer, a lower alkyl ester or an anhydride thereof, or a sulfonated polyol monomer, and those mentioned above may be used alone, or at least two types thereof may be used in combination. As the sulfonated polycarboxylic acid monomer described above, for example, there may be mentioned sulfoisophthalic acid, sulfoterephthalic acid, sulfophthalic acid, sulfosuccinic acid, sulfomalonic acid, 2,3-disulfosuccinic acid, sulfotartaric acid, sulfomalic acid, sulfomaleic acid, sulfofumaric acid, 1-sulfo-1,2-cyclohexanedicarboxylic acid, or 3-(sodiooxysulfonyl)glutaric acid. As the sulfonated polyol monomer described above, for example, there may be mentioned 2,3-dihydroxy-1-propanesulfonic acid, 3-[bis(2-hydroxyethyl)amino]-1-propanesulfonic acid, or 2-hydroxy-3-[bis(2-hydroxyethyl)amino]-1-propanesulfonic acid.

A lower limit of a content of the second monomer with respect to all the monomers forming the polyester described above is preferably 5 percent by mole, more preferably 7 percent by mole, and further preferably 9 percent by mole. In addition, an upper limit of the content of the second monomer with respect to all the monomers forming the polyester is preferably 30 percent by mole, more preferably 28 percent by mole, and further preferably 26 percent by mole.

Accordingly, the adsorption of the polyester to a dispersoid, in particular, to a highly hydrophobic dispersoid, and the affinity/solubility of the polyester to the water can be simultaneously obtained at a higher level, and when a dispersion in which a dispersoid is dispersed using the dispersant-containing liquid is prepared, the dispersion stability of the dispersoid can be made more excellent. In addition, when the dispersion is an ink jet composition, while the ejection stability of the ink jet composition by an ink jet method can be made more excellent, the color development property of a recorded portion formed using the ink jet composition can be made more excellent. In addition, the water resistance of the recorded portion formed using the ink jet composition can also be made more excellent.

In addition, a lower limit of a rate of the content of the second monomer to the content of the first monomer in the polyester described above on a molar basis is preferably 10%, more preferably 12%, and further preferably 14%. In addition, an upper limit of the rate of the content of the second monomer to the content of the first monomer in the polyester described above on a molar basis is preferably 80%, more preferably 75%, and further preferably 70%.

Accordingly, the adsorption of the polyester to a dispersoid, in particular, to a highly hydrophobic dispersoid, and the affinity/solubility of the polyester to the water can be simultaneously obtained at a higher level, and when a dispersion in which a dispersoid is dispersed using the dispersant-containing liquid is prepared, the dispersion stability of the dispersoid can be made more excellent. In addition, when the dispersion is an ink jet composition, while the ejection stability of the ink jet composition by an ink jet method can be made more excellent, the color development property of a recorded portion formed using the ink jet composition can be made more excellent. In addition, the water resistance of the recorded portion formed using the ink jet composition can also be made more excellent.

The carboxy group which forms no ester bond and the sulfo group may be present, for example, on a side chain of the polyester molecule and/or at a terminal of the main chain thereof.

When the carboxy group which forms no ester bond is present on a side chain of the polyester molecule, the carboxy group can be preferably introduced, for example, in such a manner that in synthesis of the polyester, an at least trivalent polycarboxylic acid or one of a lower alkyl ester and an anhydride thereof is used as a polycarboxylic acid monomer, or a compound having at least two hydroxy groups and at least one carboxy group is used as a polyol monomer.

In addition, when the carboxy group which forms no ester bond is present at a terminal of the main chain of the polyester, the carboxy group described above can be preferably introduced, for example, in such a manner that after a polymer is synthesized by adjusting reaction conditions so that a hydroxy group is present at the terminal, the hydroxy group at the terminal of the polymer and a carboxy group of an at least divalent polycarboxylic acid monomer functioning as a resin terminal modifier are allowed to react with each other. In addition, in the case described above, as the resin terminal modifier, a lower alkyl ester or an anhydride of the at least divalent polycarboxylic acid monomer described above may also be used.

When the sulfo group is present on a side chain of the polyester molecule, the sulfo group described above can be preferably introduced, for example, in such a manner that in synthesis of the polyester, an at least divalent polycarboxylic acid having a sulfo group or one of a lower alkyl ester and an anhydride thereof is used as a polycarboxylic acid monomer, or a compound having, besides a sulfo group, at least two hydroxy groups is used as a polyol monomer.

In addition, when the sulfo group is present at a terminal of the main chain of the polyester, the sulfo group described above can be preferably introduced, for example, in such a manner that after a polymer is synthesized by adjusting reaction conditions so that a hydroxy group is present at the terminal, the hydroxy group at the terminal of the polymer and a carboxy group of a resin terminal modifier having both a carboxy group and a sulfo group are allowed to react with each other.

As the polycarboxylic acid monomer, for example, there may be mentioned an aromatic polycarboxylic acid, such as phthalic acid, terephthalic acid, isophthalic acid, 2,5-norbornanedicarboxylic acid, 1,4-naphthalenedicarboxylic acid, biphenyldicarboxylic acid, 4,4'-sulfonyldibenzoic acid, or 2,5-naphthalenedicarboxylic acid; an aliphatic polycarboxylic acid, such as oxalic acid, malonic acid, glutaric acid, adipic acid, pimelic acid, azelaic acid, sebacic acid, fumaric acid, maleic acid, itaconic acid, 1,3-cyclopentanedicarboxylic acid, 1,2-cyclohexanedicarboxylic acid, 1,3-cyclohexanedicarboxylic acid, or 1,4-cyclohexanedicarboxylic acid; or a lower alkyl ester or an anhydride of at least one of those mentioned above, and those mentioned above may be used alone, or at least two types thereof may be used in combination.

As the polyol monomer, for example, there may be mentioned an aliphatic polyol, such as ethylene glycol, diethylene glycol, triethylene glycol, a polyethylene glycol, propylene glycol, dipropylene glycol, tripropylene glycol, a polypropylene glycol, 1,3-propanediol, neopentyl glycol, 1,3-butanediol, 1,4-butanediol, 1,5-pentanediol, 1,6-hexanediol, 2,2,4-trimethyl-1,6-hexanediol, 1,2-cyclohexanedimethanol, 1,3-cyclohexanedimethanol, 1,4-cyclohexanedimethanol, or 2,2'-bis(4-hydroxycyclohexyl)isopropane; or an aromatic polyol, such as 1,4-benzenedimethanol, 1,3-benzenedimethanol, 1,2-benzenedimethanol, biphenol, 4,4'-methylene bisphenol, 2,2-di(p-hydroxyphenyl)propane, styrene glycol, 2-phenyl-1,3-propanediol, or naphthalenediol, and those mentioned above may be used alone, or at least two types thereof may be used in combination.

A lower limit of the number average molecular weight of the polyester is preferably 1,500, more preferably 1,800, and further preferably 2,000. An upper limit of the number average molecular weight of the polyester is preferably 10,000, more preferably 8,000, and further preferably 7,000.

By the structure as described above, a water solubility of the polyester functioning as a dispersant can be made more excellent, and when a dispersion in which a dispersoid is dispersed using the dispersant-containing liquid is prepared, the dispersion stability of the dispersoid can be made more excellent. In addition, the viscosity of the dispersant-containing liquid and the viscosity of a dispersion prepared using the dispersant-containing liquid each can be adjusted in a more preferable range, and for example, when the dispersion is an ink jet composition, while the ejection stability of the ink jet composition by an ink jet method can be made more excellent, the color development property of a recorded portion formed using the ink jet composition can be made more excellent.

A lower limit of a content of the polyester in the dispersant-containing liquid is preferably 3.0 percent by mass, more preferably 4.0 percent by mass, and further preferably 4.5 percent by mass. In addition, an upper limit of the content of the polyester in the dispersant-containing liquid is preferably 35.0 percent by mass, more preferably 30.0 percent by mass, and further preferably 28.0 percent by mass.

Accordingly, the viscosity of the dispersant-containing liquid and the viscosity of a dispersion prepared using the dispersant-containing liquid are each likely to be adjusted in a preferable range, and handling of the dispersant-containing liquid and that of the dispersion each can be made more excellent. In addition, when a dispersion in which a dispersoid is dispersed using the dispersant-containing liquid is prepared, the dispersion stability of the dispersoid can also be made more excellent.

1-3. Basic Material

The dispersant-containing liquid of the present disclosure may further contain, besides the components described above, a basic material.

Accordingly, the pH of the dispersant-containing liquid can be adjusted in a preferable range, a more preferable dissolved state of the polyester can be secured in the dispersant-containing liquid, and for example, problems, such as aggregation and precipitation, caused by insolubilization of the polyester can be more effectively prevented. As a result, for example, when a dispersion in which a dispersoid is dispersed using the dispersant-containing liquid is prepared, the dispersion stability of the dispersoid can be made more excellent. In addition, when the dispersion is an ink jet composition, the ejection stability of the ink jet composition by an ink jet method can be made more excellent.

As the basic material, for example, there may be mentioned a monovalent inorganic base, a divalent inorganic base, or a water-soluble organic amine, and those mentioned above may be used alone, or at least two types thereof may be used in combination.

As the monovalent inorganic base, for example, although an alkali metal hydroxide, such as lithium hydroxide, sodium hydroxide, or potassium hydroxide, or ammonia may be mentioned, in particular, an alkali metal hydroxide is preferable, and sodium hydroxide is more preferable.

As the divalent inorganic base, for example, an alkaline earth metal hydroxide may be mentioned.

As the water-soluble organic amine, for example, an organic amine having a solubility of 10 g or more in 100 g of water at 20° C. may be used. As a concrete example of the water-soluble organic amine, for example, there may be mentioned an alkylamine, such as monoethylamine, diethylamine, triethylamine, monomethylamine, dimethylamine, or trimethylamine; diethanolamine, triethanolamine, diisopropanolamine, triisopropanolamine, butyldiethanolamine, ethyldiethanolamine, or 2-amino-2-ethyl-1,3-propanediol.

In particular, as the water-soluble organic amine, hydroxylamine is preferable, a diolamine or a triolamine is more preferable, and triethanolamine is further preferable.

Accordingly, a water solubility of the water-soluble organic amine can be increased to a particularly high level, and when a dispersion in which a dispersoid is dispersed using the dispersant-containing liquid is prepared, a long-term stability of the dispersion can be made more excellent. In addition, since the boiling point of the dispersant-containing liquid and that of a dispersion prepared using the dispersant-containing liquid can be increased, and a high hygroscopic property thereof can also be obtained, the precipitation of solid contents caused by unfavorable drying of the dispersant-containing liquid and the dispersion can be more effectively prevented.

In addition, as the basic material, the dispersant-containing liquid preferably contains a monovalent inorganic base and a water-soluble organic amine.

Accordingly, when a salt is formed with the anionic polyester described above, by a strong water solubility of the salt of the monovalent inorganic base and an affinity of the water-soluble organic amine salt to the additive used for preparation of a dispersion, the polyester described above can be stably dissolved in the dispersion, and the long-term stability of the dispersion can be made more excellent.

In addition, the basic material may be used, for example, so as to form a salt with the monomer when the polyester is synthesized or may be mixed with the synthesized polyester.

1-4. Other Components

The dispersant-containing liquid of the present disclosure may further contain components other than the components described above. Hereinafter, the "components" as described above are called "other components".

As the other components, for example, there may be mentioned a dispersant and/or a resin component other than the polyester described above; a moisturizing agent, a surface tension adjuster, an antiseptic agent, and/or a chelating agent, and those mentioned above may be used alone, or at least two types thereof may be used in combination.

However, the dispersant-containing liquid of the present disclosure is a liquid containing no dispersoid. A liquid containing, besides the constituent components of the dispersant-containing liquid of the present disclosure, a dispersoid is a dispersion of the present disclosure which will be described later.

In addition, a content of the other components in the dispersant-containing liquid of the present disclosure is preferably 10.0 percent by mass or less, more preferably 5.0 percent by mass or less, and further preferably 3.0 percent by mass or less.

1-5. Others

The dispersant-containing liquid of the present disclosure preferably satisfies the following conditions.

For example, a lower limit of the pH of the dispersant-containing liquid of the present disclosure at 20° C. is preferably 7.0, more preferably 7.2, and further preferably 7.4. In addition, an upper limit of the pH of the dispersant-containing liquid of the present disclosure at 20° C. is preferably 9.6, more preferably 9.0, and further preferably 8.6.

Accordingly, a more preferable dissolved state of the polyester can be secured, and for example, the problems, such as aggregation and precipitation, caused by the insolubilization of the polyester can be more effectively prevented. As a result, for example, when a dispersion in which a dispersoid is dispersed using the dispersant-containing liquid is prepared, the dispersion stability of the dispersoid can be made more excellent. In addition, a drying resistance of the dispersion can also be made more excellent. In addition, when the dispersion described above is an ink jet composition, the ejection stability of the ink jet composition by an ink jet method can be made more excellent.

The dispersant-containing liquid of the present disclosure can be more preferably prepared, for example, in such a manner that after the essential components, such as the solvent including a polyol and the water described above, are added to the polyester obtained by a condensation reaction, stirring is performed. In addition, while the stirring is performed, if needed, heating may also be performed.

2. Dispersion

Next, a dispersion of the present disclosure will be described.

The dispersion of the present disclosure contains a polyester functioning as a dispersant, water, and a dispersoid. The polyester described above is a polyester including as a monomer component, a first monomer having an aromatic ring on a side chain and a second monomer having at least one selected from the group consisting of a carboxy group which forms no ester bond and a sulfo group.

According to the structure as described above, the dispersion stability of the dispersoid in the dispersion can be made excellent. In particular, even in a dispersion which contains a dispersoid formed from a highly lipophilic material, such as an organic dye including, a disperse dye, an oil-soluble dye, and/or the like, the dispersion stability of the dispersoid can be made excellent. The reason the effect as described above can be obtained is believed as follows. That is, since the polyester including the first monomer and the second monomer described above is contained, while a sufficient adsorption to the highly hydrophobic dispersoid is secured, a solubility of the polyester to the water can be made sufficiently high. As a result, it is believed that the dispersion stability of the dispersoid in the dispersion can be stably obtained for a long time.

2-1. Water

The dispersion of the present disclosure contains water. The water primarily has a function to impart the fluidity to the dispersion and functions as a dispersion medium or a solvating medium.

As the water, ion exchange water, pure water, or ultrapure water is preferably used.

Although a lower limit of a content of the water in the dispersion is not particularly limited, the lower limit described above is preferably 35.0 percent by mass, more preferably 40.0 percent by mass, and further preferably 45.0 percent by mass. In addition, although an upper limit of the content of the water in the dispersion is not particularly limited, the upper limit described above is preferably 93.0 percent by mass, more preferably 90.0 percent by mass, and further preferably 87.0 percent by mass.

Accordingly, the viscosity of the dispersion can be more reliably adjusted at a preferable value. In addition, the dispersion stability of the dispersoid in the dispersion can be made more excellent.

2-2. Polyester Functioning as Dispersant

The dispersion of the present disclosure contains a polyester which includes, as a monomer component, a first monomer having an aromatic ring on a side chain and a second monomer having at least one selected from the group consisting of a carboxy group which forms no ester bond and a sulfo group.

The polyester as described above preferably satisfies conditions similar to those described in the above "1-2.".

Accordingly, an effect similar to that described above can be obtained.

A lower limit of a content of the polyester in the dispersion is preferably 0.3 percent by mass, more preferably 0.4 percent by mass, and further preferably 0.5 percent by mass. In addition, an upper limit of the content of the polyester in the dispersion is preferably 20.0 percent by mass, more preferably 18.0 percent by mass, and further preferably 16.0 percent by mass.

Accordingly, the viscosity of the dispersion is likely to be adjusted in a preferable range, handling of the dispersion can be made more excellent, and in addition, the dispersion stability of the dispersoid can be made more excellent.

In addition, a lower limit of a content of the polyester with respect to 100.0 parts by mass of the dispersoid contained in the dispersion is preferably 10.0 parts by mass, more preferably 15.0 parts by mass, and further preferably 20.0 parts by mass. In addition, an upper limit of the content of the polyester with respect to 100.0 parts by mass of the dispersoid contained in the dispersion is preferably 200.0 parts by mass, more preferably 150.0 parts by mass, and further preferably 130.0 parts by mass.

Accordingly, the viscosity of the dispersion is likely to be adjusted in a preferable range, the handling of the dispersion can be made more excellent, and in addition, the dispersion stability of the dispersoid can be made more excellent.

2-3. Dispersoid

The dispersion of the present disclosure contains a dispersoid.

The dispersoid may be contained in a dispersed state in the dispersion, and dispersoids formed from various types of materials may be used in consideration of, for example, the application of the dispersion. As a constituent material of the dispersoid, for example, there may be mentioned water-poorly soluble resin materials and various types of colorants, such as various organic colorants including organic pigments and organic dyes and various inorganic colorants including inorganic pigments and inorganic dyes.

As the organic pigment, for example, there may be mentioned a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, an azo-based pigment, or a carbon black.

In more particular, as a yellow pigment, for example, there may be mentioned C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, or 180. As a magenta pigment, for example, there may be mentioned C.I. Pigment Red 1, 2, 3, 4, 5, 6, 7, 8, 9, 10, 11, 12, 13, 14, 15, 16, 17, 18, 19, 21, 22, 23, 31, 32, 37, 38, 39, 40, 48(Ca), 48(Mn), 48:2, 48:3, 48:4, 49, 49:1, 50, 51, 52, 52:2, 53, 53:1, 55, 57(Ca), 57:1, 60, 60:1, 63:1, 63:2, 64, 64:1, 81, 83, 87, 88, 89, 90, 101, 104, 105, 106, 108, 112, 114, 122, 123, 146, 149, 163, 166, 168, 170, 172, 177, 178, 179, 184, 185, 190, 193, 202, 209, or 219. As a cyan pigment, for example, there may be mentioned C.I. Pigment Blue 1, 2, 3, 15, 15:1, 15:2, 15:34, 16, 17:1, 22, 25, 56, or 60; or C.I. Vat Blue 4, 60, or 63. As other color pigments, for example, there may be mentioned C.I. Pigment Orange 5, 13, 16, 17, 36, 43, or 51; C.I. Pigment Green 1, 4, 7, 8, 10, 17, 18, or 36; or C.I. Pigment Violet 1, 3, 5:1, 16, 19, 23, or 38.

As the organic dye, for example, a disperse dye or an oil-soluble dye may be mentioned.

As the disperse dye, for example, there may be mentioned C.I. Disperse Red 60, 82, 86, 86:1, 167:1, 279, or 364; C.I. Disperse Yellow 54, 64, 71, 86, 114, 153, 232, 233, or 245; C.I. Disperse Blue 27, 60, 73, 77, 77:1, 87, 257, 359, or 367; C.I. Disperse Violet 26, 33, 36, or 57; or C.I. Disperse Orange 30, 41, or 61.

As the oil-soluble dye, for example, there may be mentioned C.I. Solvent Yellow 16, 21, 25, 29, 33, 51, 56, 82, 88, 89, 150, or 163; C.I. Solvent Red 7, 8, 18, 24, 27, 49, 109, 122, 125, 127, 130, 132, 135, 218, 225, or 230; C.I. Solvent Blue 14, 25, 35, 38, 48, 67, 68, 70, or 132; or C.I. Solvent Black 3, 5, 7, 27, 28, 29, or 34.

The dispersoid contained in the dispersion of the present disclosure is preferably either a disperse dye or an oil-soluble dye.

Accordingly, the affinity to the polyester including the first monomer can be made more excellent, and the dispersion stability of the dispersoid in the dispersion can be made more excellent. In addition, the dispersion of the present disclosure can be preferably applied, for example, to an ink composition, in particular, to an ink jet composition, and for example, the color development property of a recorded portion formed using the above composition can be made more excellent.

Although a content of the dispersoid in the dispersion of the present disclosure is not particularly limited, a lower limit of the content of the dispersoid in the dispersion of the present disclosure is preferably 1.0 percent by mass, more preferably 2.0 percent by mass, and further preferably 3.0 percent by mass. In addition, an upper limit of the content of the dispersoid in the dispersion of the present disclosure is preferably 40.0 percent by mass, more preferably 35.0 percent by mass, and further preferably 30.0 percent by mass.

Accordingly, while the content of the dispersoid in the dispersion is increased to a sufficiently high level, the dispersion stability of the dispersoid can be made more excellent. In addition, for example, when the dispersoid is dispersed using a dispersing machine such as a bead mill, the viscosity of a dispersion to be obtained is likely to be adjusted in a preferable range. In addition, when the dispersion is an ink composition, such as an ink jet composition, the color development property of a recorded portion formed using the ink composition described above can be made more excellent.

2-4. Basic Material

The dispersion of the present disclosure may further contain, besides the components described above, a basic material.

Accordingly, since the pH of the dispersion can be adjusted in a preferable range, in the dispersion, a more preferable dissolved state of the polyester can be secured, and for example, problems, such as aggregation and precipitation, caused by insolubilization of the polyester can be more effectively prevented. As a result, for example, the dispersion stability of the dispersoid in the dispersion can be made more excellent. In addition, the drying resistance of the dispersion can also be made more excellent. In addition, when the dispersion is an ink jet composition, the ejection stability of the ink jet composition by an ink jet method can be made more excellent.

The basic material as described above preferably satisfies conditions similar to those described in the above "1-4.".

Accordingly, an effect similar to that described above can be obtained.

2-5. Moisturizing Agent

The dispersion of the present disclosure may contain a moisturizing agent.

As the moisturizing agent, for example, there may be mentioned a polyol, such as diethylene glycol, triethylene glycol, tetraethylene glycol, pentaethylene glycol, trimethylene glycol, 2-butene-1,4-diol, 2-ethyl-1,3-hexanediol, 2-methyl-2,4-pentanediol, tripropylene glycol, isobutylene glycol, propylene glycol, glycerin, diglycerin, meso-erythritol, trimethylolpropane, ditrimethylolpropane, pentaerythritol, or dipentaerythritol; a saccharide including a monosaccharide, a disaccharide, an oligosaccharide, and a polysaccharide, such as glucose, mannose, fructose, ribose, xylose, arabinose, galactose, aldonic acid, glucitol (sorbit), maltose, cellobiose, lactose, sucrose, trehalose, or maltotriose, or a derivative of at least one of those mentioned above; or a betaine such as glycine or trimethylglycine. Those mentioned above may be used alone, or at least two types thereof may be used in combination.

Although a content of the moisturizing agent in the dispersion of the present disclosure is not particularly limited, a lower limit of the content of the moisturizing agent in the dispersion of the present disclosure is preferably 3.0 percent by mass, more preferably 5.0 percent by mass, and further preferably 7.0 percent by mass. In addition, an upper limit of the content of the moisturizing agent in the dispersion of the present disclosure is preferably 40.0 percent by mass, more preferably 35.0 percent by mass, and further preferably 30.0 percent by mass.

2-6. Surface Tension Adjuster

The dispersion of the present disclosure may contain a surface tension adjuster.

As the surface tension adjuster, for example, a surfactant or a water-soluble compound having a log P of more than 0.0 to 4.0 may be mentioned.

As the surfactant, for example, although a cationic surfactant, an anionic surfactant, or a nonionic surfactant may be mentioned, in order to reduce an influence on the solubility of the polyester which is dissolved in an anionic state, in particular, a nonionic surfactant is preferable.

As a nonionic non-reactive surfactant, for example, a silicone-based surfactant, a fluorine-based surfactant, or an acetylene glycol-based surfactant may be mentioned.

As the silicone-based surfactant, for example, there may be mentioned BYK-306, BYK-307, BYK-333, BYK-341, BYK-345, BYK-346, BYK-348, BYK-349, or BYK-3455 (manufactured by BYK Japan KK); Silface SAG503A, SAG002, SAG005, or SAG014 (manufactured by Nisshin Chemical Industry Co., Ltd.); or KF-351A, KF-352A, KF-353, KF-354L, KF-355A, KF-615A, KF-945, KF-640, KF-642, KF-643, KF-6020, X-22-4515, KF-6011, or KF-6012 (manufactured by Shin-Etsu Chemical Co., Ltd.).

As the fluorine-based surfactant, for example, there may be mentioned FC-4430 or FC-4432 (manufactured by 3M Japan Limited); Megafac F-444, F-477, F-553, or F-556 (manufactured by DIC Corporation); or Surflon S-241, S-242, S-243, or S-386 (manufactured by AGC Seimi Chemical Co., Ltd.).

As the acetylene glycol-based surfactant, for example, there may be mentioned Surfynol 82, 465, 485, or 2502, Olfine E1010, E1020, PD-002W, PD-004, EXP4001, EXP4002, EXP4123, or EXP4300 (manufactured by Nisshin Chemical Industry Co., Ltd.); or Acetylenol E00, E103T, E40, E60, E100, or E200 (manufactured by Kawaken Fine Chemicals Co., Ltd.).

As the water-soluble compound having a log P of more than 0.0 to 4.0, for example, there may be mentioned a lower alcohol, such as 2-propanol (log P: 0.05). 1-propanol (log P: 0.25-butanol (log P: 0.6), or 1-butanol (log P: 0.88); a glycol monoether, such as diethylene glycol monobutyl ether (log P: 0.4), triethylene glycol monobutyl ether (log P: 0.5), propylene glycol monobutyl ether (log P: 1.2), dipropylene glycol monobutyl ether (log P: 1.5), ethylene glycol mono-2-ethylhexyl ether (log P: 2.8), or diethylene glycol mono-2-ethylhexyl ether (log P: 2.4); a lower alkyl 1.2-diol, such as 1.2-pentanediol (log P: 0.06) or 1.2-hexanediol (log P: 0.6); or a glycerin monoether, such as glycerin monobutyl ether (log P: 0.6) or glycerin-2-ethylhexyl ether (log P: 2.5).

Although a content of the surface tension adjuster in the dispersion of the present disclosure is not particularly limited, a lower limit of the content of the surface tension adjuster in the dispersion of the present disclosure is preferably 0.1 percent by mass, more preferably 0.3 percent by mass, and further preferably 1.0 percent by mass. In addition, an upper limit of the content of the surface tension adjuster in the dispersion of the present disclosure is preferably 10.0 percent by mass, more preferably 8.0 percent by mass, and further preferably 7.0 percent by mass.

2-7. Other Components

The dispersion of the present disclosure may further contain components other than the components described above. Hereinafter, the components as described above are called "other components" in this item.

As the other components, for example, there may be mentioned an antiseptic agent, a chelating agent, a dispersant, and/or a resin component, the latter two being other than the polyester described above, and those mentioned above may be used alone, or at least two types thereof may be used in combination.

Since containing an antiseptic agent, for example, the dispersion is prevented from being decomposed by microorganisms, and the precipitation and the aggregation of the solid content in the dispersion can be effectively prevented.

As the antiseptic agent, for example, there may be mentioned methylisothiazolinone, chloromethylisothiazolinone, octylisothiazolinone, dichlorooctylisothiazolinone, benzisothiazolinone, dicyclohexylamine, iodopropynyl butylcarbamate, or diethylene oximide.

Since the chelating agent is contained, for example, a polyvalent cation in the dispersion is trapped, and the precipitation and the aggregation of the solid content in the dispersion can be effectively prevented.

As the chelating agent, for example, there may be mentioned an ethylenediaminetetraacetic acid salt, a diethyltriaminepentaacetic acid salt, a pentetic acid salt, an iminodisuccinic acid salt, or an aspartic acid diacetate salt.

However, a content of the other components in the dispersion of the present disclosure is preferably 10.0 percent by mass or less, more preferably 5.0 percent by mass or less, and further preferably 3.0 percent by mass or less.

2-8. Others

The dispersion of the present disclosure preferably satisfies the following conditions.

For example, a lower limit of the pH of the dispersion of the present disclosure at 20° C. is preferably 7.0, more preferably 7.2, and further preferably 7.4. In addition, an upper limit of the pH of the dispersion of the present disclosure at 20° C. is preferably 9.6, more preferably 9.0, and further preferably 8.6.

Accordingly, a more preferable dissolved state of the polyester described above can be secured, and for example, the problems, such as aggregation and precipitation, caused by the insolubilization of the polyester can be more effectively prevented. As a result, for example, the dispersion stability of the dispersoid in the dispersion can be made more excellent. In addition, the drying resistance of the dispersion can also be made more excellent. In addition, when the dispersion is an ink jet composition, the ejection stability of the ink jet composition by an ink jet method can be made more excellent.

The dispersion of the present disclosure may be used for any application, such as paints and various types of ink compositions, but is most preferably used as an ink jet composition.

In an ink jet composition, for example, when a dispersoid in this composition is precipitated or aggregated, or when a solid content thereof is precipitated in an ink jet head or a flow path, the ejection stability by an ink jet method is seriously adversely influenced, and in some cases, the ejection of the composition by an ink jet method cannot be carried out. In other words, in the ink jet composition, the dispersion stability of the dispersoid is required to be obtained at a higher level. In order to respond to this requirement, according to the present disclosure, the dispersion stability of the dispersoid can be made particularly excellent. That is, when the dispersion is an ink jet composition, the effect of the present disclosure can be more significantly obtained. In addition, in this specification, the ink jet composition is a concept including, besides an ink jet ink itself to be ejected by an ink jet method, for example, an undiluted solution thereof to be mixed with other components for preparation of the ink jet ink.

Although a lower limit of the viscosity of the dispersion of the present disclosure at 20° C. is not particularly limited, the lower limit described above is preferably 2.0 mPa·s, more preferably 3.0 mPa·s, and further preferably 4.0 mPa·s. In addition, although an upper limit of the viscosity of the dispersion of the present disclosure at 20° C. is not particularly limited, the upper limit described above is preferably 9.0 mPa·s, more preferably 8.0 mPa·s, and further more preferably 7.0 mPa·s.

Accordingly, for example, when the dispersion of the present disclosure is an ink jet composition, the ejection stability thereof can be made more excellent.

In addition, the viscosity can be measured at 20° C., for example, using a rheometer MCR 102 (manufactured by Anton Paar) in such a manner that a shear rate is increased from 10 [$s^{-1}$] to 1,000 [$s^{-1}$], and a viscosity at a shear rate of 200 [$s^{-1}$] is read.

Although a lower limit of the surface tension of the dispersion of the present disclosure at 20° C. is not particularly limited, the lower limit described above is preferably 20 mN/m, more preferably 21 mN/m, and further preferably 23 mN/m. In addition, although an upper limit of the surface tension of the dispersion of the present disclosure at 20° C. is not particularly limited, the upper limit described above is preferably 50 mN/m, more preferably 40 mN/m, and further preferably 30 mN/m.

Accordingly, for example, when the dispersion of the present disclosure is an ink jet composition, nozzle clogging or the like of a recording apparatus using an ink jet method is more unlikely to occur, and the ejection stability of the dispersion of the present disclosure is further improved. In addition, even if the nozzle clogging occurs, when the nozzle is capped, that is, when capping is performed, a recovery property can be made more excellent.

In addition, as the surface tension, a value measured by Wilhelmy method may be used. For the measurement of the surface tension, for example, a surface tensiometer, such as a CBVP-7 (manufactured by Kyowa Interface Science Co., Ltd.), may be used.

When the dispersion of the present disclosure is an ink jet ink, the ink described above is generally received in a container, such as a cartridge, a bag, or a tank, and is then applied to a recording apparatus using an ink jet method. In other words, a recording apparatus according to the present disclosure is an apparatus including a container, such as an ink cartridge, to receive an ink jet ink which is the dispersion of the present disclosure.

The dispersion of the present disclosure can be prepared, for example, in such a manner that the dispersant-containing liquid of the present disclosure described above and a material to be used as the dispersoid are mixed together.

In the case described above, while the dispersant-containing liquid of the present disclosure and the material to be used as the dispersoid are placed in a mixed state, for example, a bead mill may be used. Accordingly, the material to be used as the dispersoid can be efficiently and finely pulverized, and hence, the dispersion stability of the dispersoid in the dispersion of the present disclosure can be made more excellent.

As the beads, for example, various types of inorganic beads, such as zirconia beads, stainless steel beads, or alumina beads, may be preferably used.

When the dispersion of the present disclosure is prepared, besides the dispersant-containing liquid of the present disclosure described above and the material to be used as the dispersoid, for example, components, such as water, a solvent, a moisturizing agent, and/or a surface tension adjuster, may also be used.

When the dispersion of the present disclosure is prepared, if needed, heating may also be performed.

In addition, the dispersion of the present disclosure is not limited to that prepared by the method as described above. For example, the dispersion of the present disclosure may also be prepared in such a manner that without using the dispersant-containing liquid of the present disclosure described above, necessary components, such as the polyester obtained by a condensation reaction, the material to be used as the dispersoid, the solvent including a polyol, and water, are collectively mixed together or are sequentially added in a predetermined order and then mixed together.

Heretofore, although preferable embodiments of the present disclosure are described, the present disclosure is not limited thereto.

EXAMPLES

Next, concrete examples of the present disclosure will be described.

3. Synthesis of Polyester

Synthetic Example 1

After 49.0 parts by mass of phenylsuccinic acid as a polycarboxylic acid having an aromatic ring on a side chain, 15.0 parts by mass of succinic anhydride, 27.0 parts by mass of 5-sulfoisophthalic acid, 31.0 parts by mass of ethylene glycol, and 4.6 parts by mass of tetrabutoxytitanate were charged in a 500-mL separable flask equipped with a stirrer and were then heated at 180° C. for 3 hours, while a volatile component was removed at a reduced pressure, heating was performed at 220° C. for 5 hours, so that a polyester as a dispersant was obtained.

Synthetic Examples 2 to 10

Except for that the types and the usages of the raw monomers used for the synthesis of the polyester were changed as shown in Table 1, a polyester was obtained in a manner similar to that of the above Synthetic Example 1.

The conditions of the polyesters obtained in the above Synthetic Examples 1 to 10 are collectively shown in Table 1. In addition, the numerical value of "COMPONENT USED FOR SYNTHESIS" in Table 1 indicates the usage of each component based on part(s) by mass. In addition, in Table 1, phenylsuccinic acid is represented by "PSA", benzylsuccinic acid is represented by "BSA", dimethyl terephthalate is represented by "TPA", dimethyl isophthalate is represented by "IPA", succinic anhydride is represented by "SA", 5-sulfoisophthalic acid is represented by "SIPA", trimellitic acid is represented by "TMA", styrene glycol is represented by "SG", bisphenol A is represented by "BisA", and ethylene glycol is represented by "EG". In addition, the number average molecular weights of the polyesters obtained in the above Synthetic Examples 1 to 8 are all in a range of 1,500 to 10,000. In addition, in each of the polyesters obtained in the above Synthetic Examples 1 to 8, the content of the first monomer with respect to all the monomers forming the polyester is in a range of 25 to 75 percent by mole, and the content of the second monomer with respect to all the monomers forming the polyester is in a range of 5 to 30 percent by mole. In addition, in each of the polyesters obtained in the above Synthetic Examples 1 to 8, the rate of the content of the second monomer to the content of the first monomer is in a range of 10% to 80% on a molar basis.

In addition, the number average molecular weight of the polyester thus obtained was measured by a GPC. In addition, the molar rate in the polyester was measured by a $^{1}$H-NMR. The sulfo group amount was calculated by measuring a sulfur amount using an XRF. The carboxy group amount was calculated from the acid value of the polyester.

TABLE 1

| | | | | | SYNTHETIC EXAMPLE | | | | | | | | | |
|---|---|---|---|---|---|---|---|---|---|---|---|---|---|---|
| | | | | | 1 | 2 | 3 | 4 | 5 | 6 | 7 | 8 | 9 | 10 |
| COMPONENT USED FOR SYNTHESIS | POLYCARBOXYLIC ACID MONOMER | SIDE-CHAIN AROMATIC RING TYPE (FIRST MONOMER) | | PSA | 49.0 | 0.0 | 29.0 | 29.0 | 39.0 | 29.0 | 29.0 | 29.0 | 0.0 | 49.0 |
| | | | | BSA | 0.0 | 0.0 | 21.0 | 21.0 | 31.0 | 21.0 | 21.0 | 0.0 | 0.0 | 0.0 |
| | | MAIN-CHAIN AROMATIC RING TYPE | | TPA | 0.0 | 19.0 | 0.0 | 0.0 | 0.0 | 0.0 | 0.0 | 5.0 | 15.0 | 0.0 |
| | | | | IPA | 0.0 | 29.0 | 0.0 | 0.0 | 0.0 | 0.0 | 0.0 | 0.0 | 10.0 | 0.0 |
| | | MAIN-CHAIN ALIPHATIC TYPE | | SA | 15.0 | 15.0 | 15.0 | 15.0 | 5.0 | 15.0 | 15.0 | 20.0 | 15.0 | 25.0 |
| | | WATER-SOLUBLE TYPE (SECOND MONOMER) | SULFONIC ACID TYPE | SIPA | 27.0 | 27.0 | 27.0 | 27.0 | 27.0 | 13.0 | 0.0 | 27.0 | 27.0 | 0.0 |
| | | | CARBOXYLIC ACID TYPE | TMA | 0.0 | 0.0 | 0.0 | 0.0 | 0.0 | 11.0 | 27.0 | 0.0 | 0.0 | 0.0 |
| | POLYOL MONOMER | SIDE-CHAIN AROMATIC RING TYPE (FIRST MONOMER) | | SG | 0.0 | 35.0 | 35.0 | 35.0 | 55.0 | 55.0 | 35.0 | 0.0 | 0.0 | 0.0 |
| | | MAIN-CHAIN AROMATIC RING TYPE | | BisA | 0.0 | 57.0 | 0.0 | 57.0 | 0.0 | 0.0 | 0.0 | 0.0 | 0.0 | 0.0 |
| | | ALIPHATIC TYPE | | EG | 31.0 | 0.0 | 16.0 | 0.0 | 6.0 | 16.0 | 16.0 | 31.0 | 31.0 | 31.0 |
| RATE OF SIDE-CHAIN AROMATIC RING MONOMER | | | | | 25% | 25% | 50% | 50% | 75% | 50% | 50% | 15% | 0% | 25% |

4. Preparation of Dispersant-Containing Liquid

Example A1

After 17.6 parts by mass of the polyester synthesized in Synthetic Example 1, 0.3 parts by mass of triethanolamine, and 50.0 parts by mass of pure water were charged in a flask, pure water was further added so that the total mass was 100.0 parts by mass, and as a result, a dispersant-containing liquid was obtained.

Examples A2 to A8

Except for that the type of polyester and the usages of triethanolamine and pure water, each of which was used for the preparation of the dispersant-containing liquid, were changed as shown in Table 2, a dispersant-containing liquid was prepared in a manner similar to that of the above Example A1.

Comparative Example A1

Except for that the type of polyester and the usages of triethanolamine and pure water, each of which was used for the preparation of the dispersant-containing liquid, were changed as shown in Table 2, a dispersant-containing liquid was prepared in a manner similar to that of the above Example A1.

Comparative Example A2

Except for that the type of polyester and the usages of triethanolamine and pure water, each of which was used for the preparation of the dispersant-containing liquid, were changed as shown in Table 2, a dispersant-containing liquid was tried to be prepared in a manner similar to that of the above Example A1. However, in this Comparative Example, since the polyester was not dissolved, a dispersant-containing liquid was not obtained in the form of solution in which the polyester functioning as a dispersant was dissolved.

The conditions of the dispersant-containing liquids according to the above Examples and Comparative Examples are collectively shown in Table 2. In addition, the numerical value of "USAGE" of "COMPONENT USED FOR PREPARATION" in Table 2 indicates the usage of each component based on part(s) by mass. In addition, in Table 2, triethanolamine is represented by "TEA".

5. Preparation of Undiluted Solution of Ink Jet Ink as Dispersion

Example B1

After 15.0 parts by mass of a disperse dye (C.I. Disperse Red 60) functioning as a colorant was added to 85.0 parts by mass of the dispersant-containing liquid prepared in the above Example A1 and was then dispersed for 6 hours by a bead mill using zirconia balls as the media, the beads were separated, and filtration was performed using a membrane filter having a pore diameter of 5 μm, so that an undiluted solution of an ink jet ink as the dispersion was obtained.

Examples B2 to B12

Except for that the type of dispersant-containing liquid and the type of colorant, each of which was used for the preparation of the undiluted solution of the ink jet ink, were changed as shown in Table 3, an undiluted solution of an ink jet ink as the dispersion was prepared in a manner similar to that of the above Example B1.

Comparative Examples B1 and B2

Except for that the type of dispersant-containing liquid, which was used for the preparation of the undiluted solution of the ink jet ink, was changed as shown in Table 3, an undiluted solution of an ink jet ink as the dispersion was prepared in a manner similar to that of the above Example B1

The conditions of the undiluted solutions of the ink jet inks according to the above Examples and Comparative Examples are collectively shown in Table 3. In addition, the numerical value of "USAGE" of "COMPONENT USED FOR PREPARATION" in Table 3 indicates the usage of each component based on part(s) by mass. In addition, in Table 3, C.I. Disperse Red 60, C.I. Disperse Yellow 54, C.I. Disperse Blue 359, C.I. Pigment Red 122, and C.I. Pigment Yellow 74 are represented by "DR60", "DY54", "DB359", "PR122", and "PY74", respectively. In addition, the pHs of the undiluted solutions of the ink jet inks according to the above Examples at 20° C. are all in a range of 7.0 to 9.0.

TABLE 2

| | | | | EXAMPLE | | | | |
|---|---|---|---|---|---|---|---|---|
| | | | | A1 | A2 | A3 | A4 | A5 |
| COMPONENT USED FOR PREPARATION | POLYESTER | | TYPE | SYNTHETIC EXAMPLE 1 | SYNTHETIC EXAMPLE 2 | SYNTHETIC EXAMPLE 3 | SYNTHETIC EXAMPLE 4 | SYNTHETIC EXAMPLE 5 |
| | | | USAGE | 17.6 | 17.6 | 17.6 | 17.6 | 17.6 |
| | BASIC MATERIAL | TEA | USAGE | 0.3 | 0.1 | 0.2 | 0.1 | 0.1 |
| | PURE WATER | | USAGE | 82.1 | 82.3 | 82.2 | 82.3 | 82.3 |

| | | | | EXAMPLE | | | COMPARATIVE EXAMPLE | |
|---|---|---|---|---|---|---|---|---|
| | | | | A6 | A7 | A8 | A1 | A2 |
| COMPONENT USED FOR PREPARATION | POLYESTER | | TYPE | SYNTHETIC EXAMPLE 6 | SYNTHETIC EXAMPLE 7 | SYNTHETIC EXAMPLE 8 | SYNTHETIC EXAMPLE 9 | SYNTHETIC EXAMPLE 10 |
| | | | USAGE | 17.6 | 17.6 | 17.6 | 17.6 | 17.6 |
| | BASIC MATERIAL | TEA | USAGE | 0.1 | 0.1 | 0.2 | 0.2 | — |
| | PURE WATER | | USAGE | 82.3 | 82.3 | 82.2 | 82.2 | 82.4 |

TABLE 3

| | | | | EXAMPLE | | | | |
|---|---|---|---|---|---|---|---|---|
| | | | | B1 | B2 | B3 | B4 | B5 |
| COMPONENT USED FOR PREPARATION | DISPERSANT-CONTAINING LIQUID | | TYPE | EXAMPLE A1 | EXAMPLE A1 | EXAMPLE A1 | EXAMPLE A1 | EXAMPLE A1 |
| | | | USAGE | 85.0 | 85.0 | 85.0 | 85.0 | 85.0 |
| | COLORANT | DR60 | USAGE | 15.0 | — | — | — | — |
| | | DY54 | USAGE | — | 15.0 | — | — | — |
| | | DB359 | USAGE | — | — | 15.0 | — | — |
| | | PR122 | USAGE | — | — | — | 15.0 | — |
| | | PY74 | | — | — | — | — | 15.0 |

| | | | | EXAMPLE | | | | |
|---|---|---|---|---|---|---|---|---|
| | | | | B6 | B7 | B8 | B9 | B10 |
| COMPONENT USED FOR PREPARATION | DISPERSANT-CONTAINING LIQUID | | TYPE | EXAMPLE A2 | EXAMPLE A3 | EXAMPLE A4 | EXAMPLE A5 | EXAMPLE A6 |
| | | | USAGE | 85.0 | 85.0 | 85.0 | 85.0 | 85.0 |
| | COLORANT | DR60 | USAGE | — | — | — | — | 15.0 |
| | | DY54 | USAGE | 15.0 | — | — | — | — |
| | | DB359 | USAGE | — | 15.0 | 15.0 | — | — |
| | | PR122 | USAGE | — | — | — | — | — |
| | | PY74 | | — | — | — | 15.0 | — |

| | | | EXAMPLE | | COMPARATIVE EXAMPLE | COMPARATIVE EXAMPLE |
|---|---|---|---|---|---|---|
| | | | B11 | B12 | B1 | B2 |
| COMPONENT USED FOR PREPARATION | DISPERSANT-CONTAINING LIQUID | | EXAMPLE A7 85.0 | EXAMPLE A8 85.0 | COMPARATIVE EXAMPLE A1 85.0 | COMPARATIVE EXAMPLE A1 85.0 |
| | COLORANT | DR60 | — | 15.0 | 15.0 | 15.0 |
| | | DY54 | — | — | — | — |
| | | DB359 | — | — | — | — |
| | | PR122 | — | — | — | — |
| | | PY74 | — | — | — | — |

6. Preparation of Ink Jet Ink as Dispersion

Example C1

First, 30.0 parts by mass of the undiluted solution of the ink jet ink prepared in the above Example B1; 5.0 parts by mass of propylene glycol, 7.0 parts by mass of glycerin, and 5.0 parts by mass of diethylene glycol as a moisturizing agent; and 5.0 parts by mass of butyl triglycol, 0.5 parts by mass of Olfine E1010 (manufactured by Nisshin Chemical Industry Co., Ltd.), and 0.5 parts by mass of BYK-348 (manufactured by BYK Japan KK) as a surface tension adjuster were mixed together. Subsequently, after pure water was further added so that the total mass was 100.0 parts by mass and then stirred in an environment at 20° C. for 30 minuets, filtration was performed using a membrane filter having a pore diameter of 5 μm, so that an ink jet ink as the dispersion was obtained.

Examples C2 to C12

Except for that the type of undiluted solution of the ink jet ink used for the preparation of the ink jet ink was changed as shown in Table 4, an ink jet ink as the dispersion was prepared in a manner similar to that of the above Example C1.

Comparative Example C1

Except for that the type of undiluted solution of the ink jet ink used for the preparation of the ink jet ink was changed as shown in Table 4, an ink jet ink as the dispersion was prepared in a manner similar to that of the above Example C1.

The conditions of the ink jet inks according the above Examples and Comparative Examples are collectively shown in Table 4. In addition, the numerical value of "USAGE" of "COMPONENT USED FOR PREPARATION" in Table 4 indicates the usage of each component based on part(s) by mass. In addition, in Table 4, propylene glycol is represented by "PG", glycerin is represented by "GL", diethylene glycol is represented by "DEG", and butyl triglycol is represented by "BTG". In addition, the pHs of the ink jet inks according to the above Examples at 20° C. are all in a range of 7.0 to 9.0. In addition, the viscosities of the ink jet inks according to the above Examples are all in a range of 2.0 to 9.0 mPa·s. In addition, the viscosity was measured using a rheometer MCR 102 manufactured by Anton Paar in such a manner that at 20° C., a shear rate was increased from 10 [$s^{-}$] to 1,000 [$s^{-}$], and a viscosity at a shear rate of 200 [$s^{-}$] was read. In addition, the surface tensions of the ink jet inks of the above Examples are all in a range of 23 to 30 mN/m. In addition, the surface tension was measured at 20° C. by Wilhelmy method using a surface tensiometer (CBVP-7, manufactured by Kyowa Interface Science Co., Ltd.).

TABLE 4

| | | | | EXAMPLE | | | | |
|---|---|---|---|---|---|---|---|---|
| | | | | C1 | C2 | C3 | C4 | C5 |
| COMPONENT USED FOR PREPARATION | UNDILUTED SOLUTION OF INK JET INK | | TYPE | B1 EXAMPLE | B2 EXAMPLE | B3 EXAMPLE | B4 EXAMPLE | B5 EXAMPLE |
| | | | USAGE | 30.0 | 30.0 | 30.0 | 30.0 | 30.0 |
| | MOISTURIZING AGENT | PG | USAGE | 5.0 | 5.0 | 5.0 | 5.0 | 5.0 |
| | | GL | USAGE | 7.0 | 7.0 | 7.0 | 7.0 | 7.0 |
| | | DEG | USAGE | 5.0 | 5.0 | 5.0 | 5.0 | 5.0 |
| | SURFACE TENSION ADJUSTER | BTG | USAGE | 5.0 | 5.0 | 5.0 | 5.0 | 5.0 |
| | | BYK348 | USAGE | 0.5 | 0.5 | 0.5 | 0.5 | 0.5 |
| | | OLFINE E1010 | USAGE | 0.5 | 0.5 | 0.5 | 0.5 | 0.5 |
| | PURE WATER | | USAGE | 47.0 | 47.0 | 47.0 | 47.0 | 47.0 |

| | | | | EXAMPLE | | | | |
|---|---|---|---|---|---|---|---|---|
| | | | | C6 | C7 | C8 | C9 | C10 |
| COMPONENT USED FOR PREPARATION | UNDILUTED SOLUTION OF INK JET INK | | TYPE | B6 EXAMPLE | B7 EXAMPLE | B8 EXAMPLE | B9 EXAMPLE | B10 EXAMPLE |
| | | | USAGE | 30.0 | 30.0 | 30.0 | 30.0 | 30.0 |
| | MOISTURIZING AGENT | PG | USAGE | 5.0 | 5.0 | 5.0 | 5.0 | 5.0 |
| | | GL | USAGE | 7.0 | 7.0 | 7.0 | 7.0 | 7.0 |
| | | DEG | USAGE | 5.0 | 5.0 | 5.0 | 5.0 | 5.0 |
| | SURFACE TENSION ADJUSTER | BTG | USAGE | 5.0 | 5.0 | 5.0 | 5.0 | 5.0 |
| | | BYK348 | USAGE | 0.5 | 0.5 | 0.5 | 0.5 | 0.5 |
| | | OLFINE E1010 | USAGE | 0.5 | 0.5 | 0.5 | 0.5 | 0.5 |
| | PURE WATER | | USAGE | 47.0 | 47.0 | 47.0 | 47.0 | 47.0 |

| | | | | EXAMPLE | | COMPARATIVE EXAMPLE |
|---|---|---|---|---|---|---|
| | | | | C11 | C12 | C1 |
| COMPONENT USED FOR PREPARATION | UNDILUTED SOLUTION OF INK JET INK | | TYPE | B11 EXAMPLE | B12 EXAMPLE | EXAMPLE B1 COMPARATIVE |
| | | | USAGE | 30.0 | 30.0 | 30.0 |
| | MOISTURIZING AGENT | PG | USAGE | 5.0 | 5.0 | 5.0 |
| | | GL | USAGE | 7.0 | 7.0 | 7.0 |
| | | DEG | USAGE | 5.0 | 5.0 | 5.0 |
| | SURFACE TENSION ADJUSTER | BTG | USAGE | 5.0 | 5.0 | 5.0 |
| | | BYK348 | USAGE | 0.5 | 0.5 | 0.5 |
| | | OLFINE E1010 | USAGE | 0.5 | 0.5 | 0.5 |
| | PURE WATER | | USAGE | 47.0 | 47.0 | 47.0 |

7. Evaluation 7-1. Evaluation of Storage Stability by Stability of Viscosity

After the undiluted solutions of the ink jet inks of the above Examples B1 to B12 and Comparative Example B1 and the ink jet inks of the above Examples C1 to C12 and Comparative Example C1 were each received in a sample container and then left at 70° C. for 10 days, the viscosity thereof was measured at 20° C. The viscosity thus measured was then compared with the viscosity of the ink jet ink immediately after manufacturing at 20° C. and was evaluated in accordance with the following criteria. As the rate of change in viscosity is smaller, the dispersion stability of the dispersoid is regarded as superior.

A: Rate of change in viscosity from that immediately after manufacturing is less than 10%.

B: Rate of change in viscosity from that immediately after manufacturing is 10% to less than 20%.

C: Rate of change in viscosity from that immediately after manufacturing is 20% or more.

D: Viscosity cannot be measured since aggregation and/or gelation occurs.

7-2. Evaluation of Storage Stability by Stability of Particle Diameter

After the undiluted solutions of the ink jet inks of the above Examples B1 to B12 and Comparative Example B1 and the ink jet inks of the above Examples C1 to C12 and Comparative Example C1 were each received in a sample container and then left at 70° C. for 10 days, the average particle diameter of the dispersoid contained in the ink jet ink was measured in an environment at 20° C. Subsequently, the average particle diameter thus measured was compared with the average particle diameter of the dispersoid contained in the ink jet ink immediately after manufacturing and was then evaluated in accordance with the following criteria. As the rate of change in particle diameter of the dispersoid is smaller, the dispersion stability of the dispersoid is regarded as superior. In addition, in this specification, unless otherwise particularly noted, the average particle diameter indicates a volume average particle diameter. In addition, the average particle diameter was obtained by measurement using a zeta potential/particle diameter measurement device ELSZ-1000 (manufactured by Otsuka Electronics Co., Ltd.).

A: Rate of change in average particle diameter of dispersoid from that immediately after manufacturing is less than 15%.

B: Rate of change in average particle diameter of dispersoid from that immediately after manufacturing is 15% to less than 30%.

C: Rate of change in average particle diameter of dispersoid from that immediately after manufacturing is 30% or more.

D: particle diameter of dispersoid cannot be measured since aggregation and/or gelation occurs.

The evaluation results described above are collectively shown in Table 5.

TABLE 5

| | | EXAMPLE | | | | | | | | | | | | COMPARATIVE EXAMPLE |
|---|---|---|---|---|---|---|---|---|---|---|---|---|---|---|
| | | B1 | B2 | B3 | B4 | B5 | B6 | B7 | B8 | B9 | B10 | B11 | B12 | B1 |
| EVALUATION OF STORAGE STABILITY OF UNDILUTED SOLUTION OF INK JET INK | STABILITY OF VISCOSITY | B | B | B | B | B | B | A | B | B | B | B | B | C |
| | STABILITY OF PARTICLE DIAMETER | B | B | B | B | B | B | A | B | B | A | B | C | D |

| | | EXAMPLE | | | | | | | | | | | | COMPARATIVE EXAMPLE |
|---|---|---|---|---|---|---|---|---|---|---|---|---|---|---|
| | | C1 | C2 | C3 | C4 | C5 | C6 | C7 | C8 | C9 | C10 | C11 | C12 | C1 |
| EVALUATION OF STORAGE STABILITY OF INK JET INK | STABILITY OF VISCOSITY | B | B | B | B | B | B | A | B | B | B | B | B | C |
| | STABILITY OF PARTICLE DIAMETER | B | B | B | B | B | B | A | B | B | A | B | C | D |

As apparent from Table 5, according to the present disclosure, the storage stability is excellent. On the other hand, in the Comparative Examples, the storage stability is inferior, and a satisfactory result cannot be obtained.

What is claimed is:

1. A dispersant-containing liquid comprising:
a polyester functioning as a dispersant; and
water,
wherein the polyester includes, as a monomer component, a first monomer having an aromatic ring on a side chain and a second monomer having at least one selected from the group consisting of a carboxy group which forms no ester bond and a sulfo group, and
the first monomer is at least one selected from the group consisting of phenylsuccinic acid, benzylsuccinic acid, phenylmethanediol, styrene glycol, 2-phenyl-1,3-propanediol, 3-phenyl-1,2-propanediol, and 4-phenyl-1,2-butanediol.

2. The dispersant-containing liquid according to claim 1, wherein a content of the first monomer with respect to all monomers forming the polyester is 25 to 75 percent by mole.

3. The dispersant-containing liquid according to claim 1, wherein a content of the second monomer with respect to all monomers forming the polyester is 5 to 30 percent by mole.

4. The dispersant-containing liquid according to claim 1, wherein in the polyester, a ratio of a content of the second monomer to a content of the first monomer on a molar basis is 10% to 80%.

5. The dispersant-containing liquid according to claim 1, further comprising:
a monovalent inorganic base; and
a water-soluble organic amine.

6. The dispersant-containing liquid according to claim 5, wherein the water-soluble organic amine is hydroxylamine.

7. The dispersant-containing liquid according to claim 1, wherein the second monomer is at least one selected from the group consisting of tricarballylic acid, β-alanine diacetic acid, mellophanic acid, N,N-bis(2-hydroxyethyl)-β-alanine, and N,N-bis(2-hydroxyethyl) succinamic acid.

8. A dispersion comprising:
a polyester functioning as a dispersant;
water; and
a dispersoid,
wherein the polyester includes, as a monomer component, a first monomer having an aromatic ring on a side chain and a second monomer having at least one selected from the group consisting of a carboxy group which forms no ester bond and a sulfo group, and
the first monomer is at least one selected from the group consisting of phenylsuccinic acid, benzylsuccinic acid, phenylmethanediol, styrene glycol, 2-phenyl-1,3-propanediol, 3-phenyl-1,2-propanediol, and 4-phenyl-1,2-butanediol.

9. The dispersion according to claim 8,
wherein the dispersoid is a disperse dye or an oil-soluble dye.

10. The dispersion according to claim 8,
wherein the dispersion is an ink jet composition.

11. The dispersion according to claim 8, wherein the second monomer is at least one selected from the group consisting of tricarballylic acid, β-alanine diacetic acid, mellophanic acid, N,N-bis(2-hydroxyethyl)-β-alanine, and N,N-bis(2-hydroxyethyl) succinamic acid.

* * * * *